United States Patent

Wei et al.

[11] Patent Number: 5,078,025
[45] Date of Patent: Jan. 7, 1992

[54] DIRECT TRANSMISSION SYSTEM FOR A BICYCLE

[76] Inventors: Lee Wei, No. 16-1, Lane 417, Syn Ping Rd.; Ta C. Lai, No. 6, Alley 15, Wu Chung Hsiang, Chung Ching Rd., both of Taichung, Taiwan

[21] Appl. No.: 620,235

[22] Filed: Oct. 29, 1990

[51] Int. Cl.⁵ .......................... F16H 1/14; G05G 1/14
[52] U.S. Cl. ........................ 74/594.1; 74/417
[58] Field of Search ............. 74/594.1–594.5, 74/417

[56] References Cited

U.S. PATENT DOCUMENTS

| | | | |
|---|---|---|---|
| 520,396 | 5/1894 | Grant | 74/417 |
| 601,025 | 3/1898 | Mooney | 74/417 |
| 607,972 | 7/1898 | Vignal | 74/417 |
| 609,344 | 8/1898 | Harrity | 74/417 |
| 610,277 | 9/1898 | O'Connor et al. | 74/417 |
| 614,250 | 11/1898 | Kershaw | 74/417 |
| 617,635 | 1/1899 | Brooks | 74/417 |
| 646,581 | 4/1900 | Mantel | 74/417 |
| 663,816 | 12/1900 | Mantel | 74/417 |
| 747,783 | 12/1903 | Somerby | 74/417 |
| 821,340 | 5/1906 | Copeland | 74/417 |

FOREIGN PATENT DOCUMENTS

| | | | |
|---|---|---|---|
| 111958 | 5/1898 | Fed. Rep. of Germany | 74/417 |
| 20589 | 10/1899 | Switzerland | 74/417 |
| 10934 | of 1898 | United Kingdom | 74/417 |

*Primary Examiner*—Vinh T. Luong
*Attorney, Agent, or Firm*—Townsend and Townsend

[57] ABSTRACT

A direct transmission for a bicycle has a box disposed on a rear axle on which a conical gear is disposed. A shaft is coupled to the conical gear so as to drive the hub. A spring biases the shaft toward an annular flange in order that the shaft can not move longitudinally relative to the box. A hole with a notch is formed in a rear and outer end of the box. The rear axle can be inserted through the notch into the hole. A sleeve nut is engageable with the rear axle so as to stably retain the rear axle in position.

2 Claims, 3 Drawing Sheets

DIRECT TRANSMISSION SYSTEM FOR A BICYCLE

BACKGROUND OF THE INVENTION

1. Field of the Invention

The present invention relates to a transmission system, and more particularly to a direct transmission system for a bicycle or the like.

2. Description of the Prior Art

A direct transmission system for bicycles is disclosed in U.S. Pat. No. 3,861,715 to Mendoza. In this patent, the bicycle hub is driven to rotate by the shaft 20 via an engagement between the conical gear 25 and the conical gear portion 40 of the mobile cone 39. The axle 31 of the bicycle rear wheel is fixed to the lower back fork of the bicycle. One end of the axle 31 is fixed to the tube 27 by means of an angled beam 34, which is welded on one end to the tube 27. A box 58 is provided to house the direct transmission system of the bicycle.

The direct transmission system has at least the following two problems. First, one end of the axle 31 which is fixed to the angled beam 34 is fixed in place by the spacer 36 and the nut 35 and is housed by the box 58. This is very inconvenient when the bicycle has a flat tire and when the rear wheel has to be removed from the lower back fork of the bicycle in order to repair the flat tire. The box 58 should be removed before the axle 31 can be detached. Second, the shaft 20 may move longitudinally so that the conical gear 25 which is fixed to the rear end of the shaft 20 may be separated from the engagement with the conical gear portion 40 of the mobile cone 39.

The present invention has arisen to mitigate and/or obviate the afore-described disadvantages of the conventional direct transmission system.

SUMMARY OF THE INVENTION

The primary objective of the present invention is to provide a direct transmission system for a bicycle or the like, in which the rear wheel axle of the bicycle can be stably fixed to the lower rear fork and can be easily removed without detaching the box for housing the direct transmission system.

The other objective of the present invention is to provide a direct transmission system for a bicycle or the like, in which the shaft of the bicycle can be stably supported to move rotationally only and can not move longitudinally.

In accordance with one aspect of the invention, there is provided a direct transmission which is suitable for being used in a bicycle. The bicycle has a hub rotatably provided around said rear axle. A box is provided on one end of the rear axle. A mobile cone with a conical gear is rotatably provided around the rear axle. A conical gear which is formed on a rear end of a shaft is engaged with the conical gear of the mobile cone so that the hub can be driven by the shaft. A sleeve with an annular flange formed therein is force-fitted within the box. A ball bearing is provided on each side of the annular flange. The conical gear of the shaft has a larger diameter than that of the shaft and so that the shaft can not move toward the annular flange of the sleeve. A gasket bears against one of the ball bearings. A retaining ring is engaged on the shaft and a spring is biased between the retaining ring and the gasket so that the shaft is biased to move toward the annular flange and so that the shaft can not move longitudinally relative to the box. A notch is formed in a rear and outer end of the box, and a hole is formed in an inner end of the notch. The rear axle can be inserted through the notch into the hole. A sleeve nut is inserted into the hole and is threadedly engaged to a free end of the rear axle so that the rear axle can be stably retained in position. A ring is rotatably supported on a free end of the cone. A rib is formed on an outer peripheral surface of the ring. A first member is integrally fixed to the box. A second member can be fixed to the first member for holding the ring. When the two members are fixed together, an annular groove is formed in the members so as to receive the rib of the ring so that the box can be stably retained in place.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
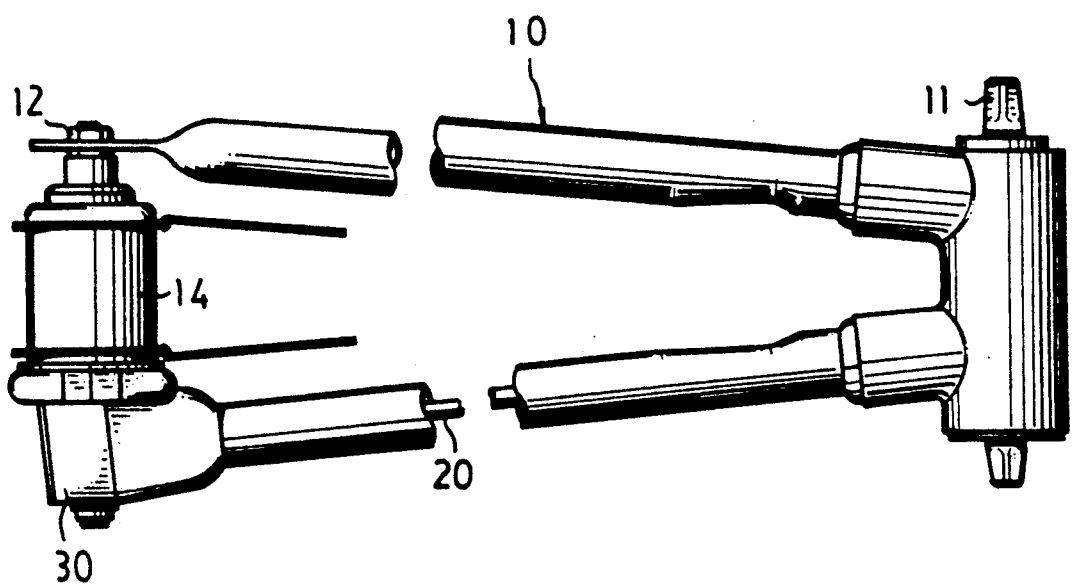
FIG. 1 is a partial top plane view of a direct transmission system in accordance with the present invention.

Referring to the drawings and initially to FIG. 1, the direct transmission system in accordance with the present invention is generally provided for a bicycle and the like. The bicycle has a front axle 11 rotatably supported on a front end of a frame 10 and a rear axle 12 fixed to a rear end of the frame 10. A hub 14 is rotatably coupled on the rear axle 12. A box 30 is fixed on one side of the rear axle 12 for housing the direct transmission system.

Figure 2:
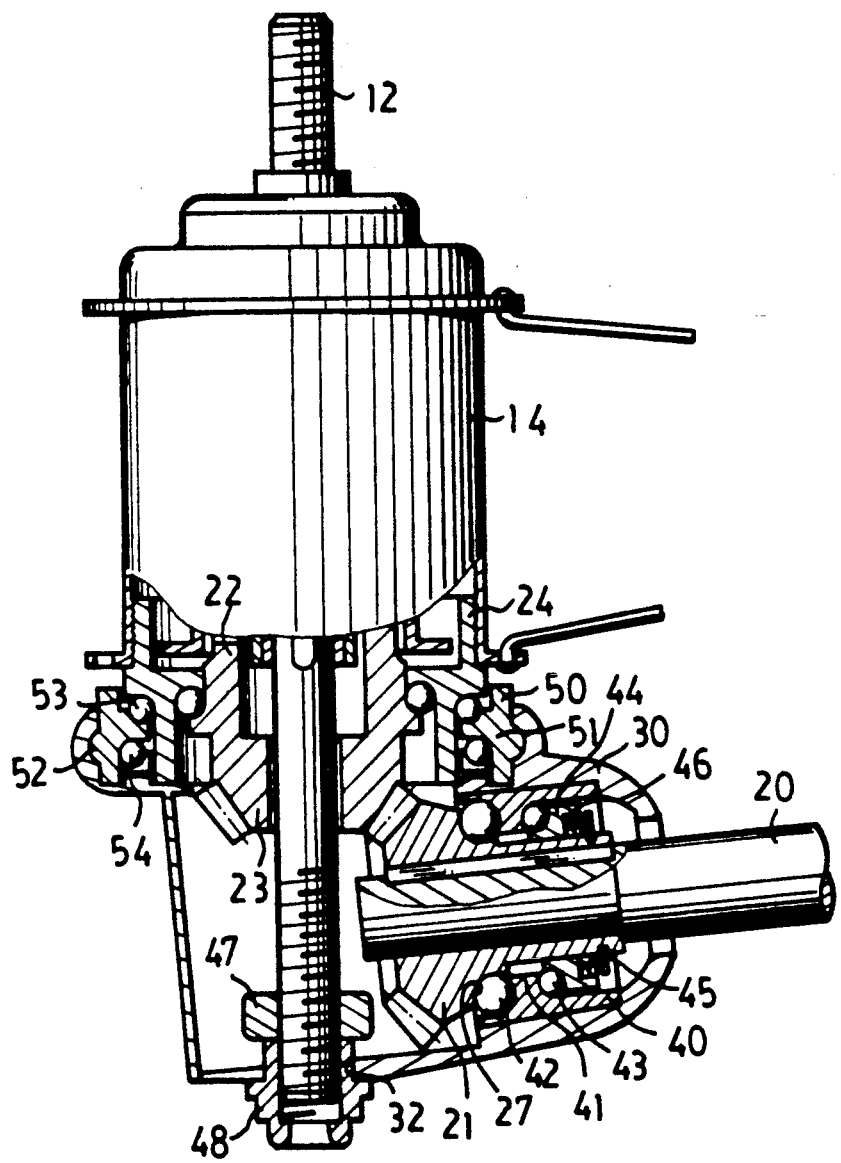
FIG. 2 is a partial cross sectional view illustrating an end portion of the direct transmission system.
Figure 3:
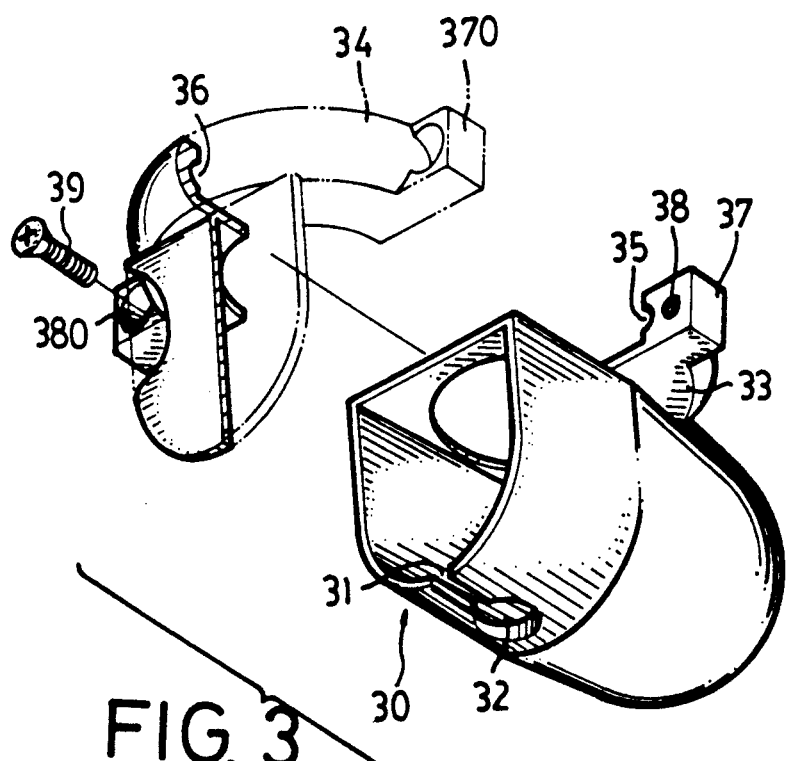
FIG. 3 is an exploded view of a box for housing the rear end portion of the direct transmission system.

Referring next to FIGS. 2 and 3, a rear end of a shaft 20 extends into the box 30. A first conical gear portion 21 is formed on the rear end of the shaft 20. A first cone 22 which is rotatably provided around the rear axle 12 has a second conical gear portion 23 formed on the right end portion for engagement with the first conical gear portion 21 of the shaft 20. The hub 14 is driven to rotate by the first cone 22 which is driven by the shaft 20 via the engagement between the conical gear portions 21, 23 thereof. How can the hub 14 be caused to rotate is well known in the art and will not be described in further details.

As shown in FIG. 2, a sleeve 40 is force-fitted within the box 30. An annular flange 41 is formed in the inner surface of the sleeve 40. A ball bearing 42, 43 is provided on each side of the annular flange 41. The first conical gear portion 21 has a larger diameter than that of the shaft 20 so that a shoulder 27 is formed behind the first conical gear portion 21. The ball bearing 42 is rotatably received between the shoulder 27 and the annular flange 41. Due to the enlarged diameter of the first conical gear portion 21, the shaft 20 can not move upward relative to the box 30. A gasket 44 bears against the ball bearing 43. A retaining ring 45 is engaged on the shaft 20. A spring 46 is biased between the retaining ring 45 and the gasket 44 so that the shaft 20 is biased upward relative to the box 30 by the spring 46 and so that the shaft 20 can not move longitudinally relative to the box 30.

As shown in FIG. 3, a notch 31 is formed in a rear and outer end of the box 30, and a hole 32 is formed in the inner end of the notch 31. The width of the notch 31 is substantially equal to the diameter of the rear axle 12 so that the rear axle 12 can be directly inserted through the notch 31 into the hole 32. A nut 47 is threadedly engaged on the rear axle 12. A sleeve nut 48 which has an outer diameter substantially equal to the inner diameter of the hole 32 is inserted into the hole 32 and is threadedly engaged to the free end of the rear axle 12 so that the rear axle 12 can be stably retained in position. When the rear axle 12 is required to be removed from the box 30, it is only required to unthread the sleeve nut 48 from the rear axle 12 so that the rear axle 12 can be removed out of the box 30 through the notch 31.

A second cone 24 is threaded to the right end of the hub 14 and is rotatable relative to the first cone 22. A ring element 50 which has an annular flange 51 formed therein is rotatably supported on the free end of the second cone 24 by two ball bearings 53, 54. A rib 52 is formed on the outer peripheral surface of the ring element 50. As shown in FIG. 3, a first member 33 which is semi-circular is integrally fixed to the box 30 by such as welding. Two lugs 37, each with a screw hole formed therein, are integrally formed on the first member 33. A groove 35 is formed in the inner peripheral surface of the first member 33. A second member 34 which is also semi-circular has a lug 370 formed on each end thereof. A hole 380 is formed in each lug 370. A groove 36 is formed in the inner peripheral surface of the second member 34. When the two members 33, 34 are provided around the ring element 50 and are fixed together by such as screws 39, the grooves 35 and 36 form an annular groove so as to receive the rib 52 of the ring element 50 so that the box 30 can be stably retained in place.

Accordingly, the direct transmission system in accordance with the present invention has the following advantages:

(1) The rear wheel axle of the bicycle can be stably fixed to the lower rear fork and can be easily removed without detaching the box provided for housing the direct transmission system.

(2) The shaft of the bicycle can be stably supported to move rotationally only and can not move longitudinally.

(3) The box 30 can be stably retained in place

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A direct transmission system for a bicycle, said bicycle including a front axle rotatably supported on a front end of a frame, and a rear axle fixed on a rear end of said frame, a hub being rotatably provided around said rear axle, a box being provided on one end of said rear axle, said direct transmission system being disposed within said box and comprising a shaft having a rear end extending into said box, a first conical gear portion being formed on said rear end of said shaft, a first cone having a second conical gear portion formed on one end thereof and being rotatably provided around said rear axle, a second cone being coupled to one end of said hub and rotatable relative to said first cone, said first conical gear portion of said shaft being engaged with said second conical gear portion of said first cone so that said first cone can be driven by said shaft to rotate via engagement between said first and said second conical gear portions, a sleeve being force-fitted within said box, an annular flange being formed in an inner surface of said sleeve, a pair of ball bearings being provided on both sides of said annular flange, said second conical gear portion having a larger diameter than that of said shaft and one of said ball bearings being rotatably received between said second conical gear portion and said annular flange so that said shaft can not move toward said annular flange, a gasket bearing against another ball bearing, a retaining ring being engaged on said shaft, a spring being biased between said retaining ring and said gasket so that said shaft is biased toward said annular flange and so that said shaft can not move longitudinally relative to said box, a notch being formed in a rear and outer end of said box, and a hole being formed in an inner end of said notch, said rear axle can be inserted through said notch into said hole, a sleeve nut being inserted into said hole and being threadedly engaged to a free end of said rear axle so that said rear axle can be stably retained in position and can be easily detached.

2. A direct transmission system according to claim 1, wherein a ring is rotatably supported on a free end of said second cone, a rib is formed on an outer peripheral surface of said ring, a first member which is semi-circular is integrally fixed to said box, a second member which is semi-circular can be fixed to said first member for holding said ring, a groove is formed in an inner peripheral surface of each of said first member and said second member, when said first member and said second member are fixed together, said grooves form an annular groove so as to receive said rib of said ring so that said box can be stably retained in place.

* * * * *